(12) United States Patent
Ruvalcaba et al.

(10) Patent No.: US 8,804,554 B2
(45) Date of Patent: Aug. 12, 2014

(54) APPARATUS AND METHOD FOR ARBITRATION OF UPDATES PROVIDED TO A UNIVERSAL INTEGRATED CIRCUIT CARD

(75) Inventors: Jose Alfredo Ruvalcaba, Winchester, CA (US); Damir Didjusto, San Diego, CA (US); Xiaomin Zhu, San Diego, CA (US); Shriram Ganesh, San Diego, CA (US); Jayesh Sharma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 13/270,142

(22) Filed: Oct. 10, 2011

(65) Prior Publication Data

US 2012/0275321 A1 Nov. 1, 2012

Related U.S. Application Data

(60) Provisional application No. 61/480,202, filed on Apr. 28, 2011.

(51) Int. Cl.
*H04W 4/00* (2009.01)
*H04W 4/20* (2009.01)
*H04W 88/06* (2009.01)

(52) U.S. Cl.
CPC ............... *H04W 4/20* (2013.01); *H04W 4/003* (2013.01); *H04W 88/06* (2013.01)
USPC ........................................................ 370/252

(58) Field of Classification Search
None
See application file for complete search history.

(56) References Cited

U.S. PATENT DOCUMENTS

| | | | |
|---|---|---|---|
| 2007/0298801 A1 | 12/2007 | Kim et al. | |
| 2008/0300020 A1* | 12/2008 | Nishizawa et al. | 455/558 |
| 2010/0069119 A1* | 3/2010 | Mueck et al. | 455/561 |
| 2010/0099412 A1 | 4/2010 | Ramachandran et al. | |
| 2010/0240367 A1 | 9/2010 | Lee et al. | |

(Continued)

OTHER PUBLICATIONS

3GPP TS 31.111, V10.2.0, "3rd Generation Partnership Project; Technical Specification Group Core Network and Terminals; Universal Subscriber Identity Module (USIM) Application Toolkit (USAT) (Release 10)", 3GPP Standard; 3GPP TS 31.111, 3rd Generation Partnership Project (3GPP), Mobile Competence Centre ; 650, Route des Lucioles ; F-06921 Sophia-Antipolis Cedex; France, No. V10.2. 0, Apr. 11, 2011, pp. 1-115, XP050477504, [retrieved on Apr. 11, 2011].

(Continued)

*Primary Examiner* — John Blanton
(74) *Attorney, Agent, or Firm* — Charles E. Eggers

(57) ABSTRACT

Systems and methodologies are described that determine whether to communicate an update message to a UICC. A UE may be equipped a status update message from at least one of a first radio access technology (RAT) module supporting a first RAT and a second RAT module supporting a second RAT. The first RAT and the second RAT are different. Further, the UE may be equipped to determine whether to generate a universal integrated circuit card (UICC) update message to update a UICC by applying one or more RAT arbitration factors to the received status update message. The UICC includes current UICC status information associated with a current RAT. A status update message may include, a service status, RAT information, and location information, and the UE may apply the RAT arbitration factors to at least a portion of the status update message.

40 Claims, 7 Drawing Sheets

(56) References Cited

U.S. PATENT DOCUMENTS

2010/0284337 A1 11/2010 Luft et al.
2011/0103277 A1 5/2011 Watfa et al.
2011/0244874 A1* 10/2011 Fodor et al. .................. 455/450
2012/0164948 A1* 6/2012 Narasimha et al. .......... 455/63.1

OTHER PUBLICATIONS

ETSI TS 102 223, V8.0.0, (Jul. 2008), "Smart Cards; Card Application Toolkit (CAT) (Release 8)", ETSI Standard, European Telecommunications Standards Institute (ETSI), Sophia Antipolis Cedex, France, vol. SCO-WG3, No. V8.0.0, Jul. 1, 2008, XP014041999.

Francis et al., "An Architecture to Support Multiple Subscriber Indentity Applications Accessing Multiple Mobile Telecommunication Access Network Systems", Third 2008 International Conference on Convergence and Hybrid Information Technology, pp. 386-395 (2008).

International Search Report and Written Opinion—PCT/US2012/034904—ISA/EPO—Oct. 10, 2012, Mouly M., et al., "Radio Resource Management", Jan. 1, 1993, GSM System for Mobile Communications, Lassay-les-Chateaux, Europe Media, FR, pp. 308-430, XP000860006.

* cited by examiner

APPARATUS AND METHOD FOR ARBITRATION OF UPDATES PROVIDED TO A UNIVERSAL INTEGRATED CIRCUIT CARD

CLAIM OF PRIORITY UNDER 35 U.S.C. §119

The present Application for Patent claims priority to Provisional Application No. 61/480,202 entitled "APPARATUS AND METHOD FOR ARBITRATION OF UPDATES PROVIDED TO A UNIVERSAL INTEGRATED CIRCUIT CARD" filed Apr. 28, 2011, and assigned to the assignee hereof and hereby expressly incorporated by reference herein.

BACKGROUND

1. Field

The present application relates generally to wireless communications, and more specifically to methods and systems for determining whether to communicate an update message to a universal integrated circuit card (UICC).

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, time division synchronous code division multiple access (TD-SCDMA) systems and orthogonal frequency division multiple access (OFDMA) systems.

Generally, a wireless multiple-access communication system can support communication for multiple wireless terminals. Each terminal communicates with one or more base stations via transmissions on the forward and reverse links. The forward link (or downlink (DL)) refers to the communication link from the base stations to the terminals, and the reverse link (or uplink (UL)) refers to the communication link from the terminals to the base stations. This communication link may be established via a single-in-single-out, multiple-in-signal-out or a multiple-in-multiple-out (MIMO) system.

Further, a terminal may include a UICC and may be support contemporaneous communications with multiple radio access technologies (RAT). Some legacy terminals (e.g. user equipments (UEs)) can provide location status information on a single radio access technology at a time. If a terminal supports contemporaneous communications with multiple active RATs, the location status information from different RATs could interleave with each other and/or could interfere with a UICC toolkit application that assumes that a single RAT is active.

For example if a UE reports to the UICC that the UE is currently on LTE network with normal service and thereafter a CDMA network with normal service becomes available, a location status envelope indicating a CDMA network with normal service may be sent to the UICC. The location status envelope command may include CDMA specific location information such as a mobile country code (MCC), a system identifier (SID), a network identifier (NID), etc. The UICC may use the location information from CDMA instead of LTE, and the UE may indicate that the CDMA RAT is available, even though the UE is still actively associated with the LTE network. Further, if the UE subsequently moves out of the LTE coverage region, a location status envelope command of no service may be sent from the RAT module associated with the LTE network to the UICC even though normal service is available through the CDMA network. As such, the UICC may act as if the UE is without of service, even though the UE is within a coverage region of the CDMA network. Additionally, the UE may also send wrong result of Provide Local Information (PLI) proactive command to the UICC if the UICC request is based on an assumption of coverage by a first RAT while the UE is on a different RAT.

Therefore, a system and method that allows the UICC to maintain up to date information while avoiding confusion associated with available service from multiple RATs is desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with determining whether to communicate an update message to a UICC. In one example, a UE may be equipped a status update message from at least one of a first radio access technology (RAT) module supporting a first RAT and a second RAT module supporting a second RAT. The first RAT and the second RAT are different. Further, the UE may be equipped to determine whether to generate a universal integrated circuit card (UICC) update message to update a UICC by applying one or more RAT arbitration factors to the received status update message. The UICC includes current UICC status information associated with a current RAT. A status update message may include, a service status, RAT information, and location information, and the UE may apply the RAT arbitration factors to at least a portion of the status update message.

According to related aspects, a method for determining whether to communicate an update message to a UICC is provided. The method can comprise receiving a status update message from at least one of a first RAT module supporting a first RAT and a second RAT module supporting a second RAT, wherein the first RAT and the second RAT are different. Moreover, the method may include determining whether to generate a UICC update message to update a UICC by applying one or more RAT arbitration factors to the received status update message, wherein the UICC includes current UICC status information associated with a current RAT.

Another aspect relates to a wireless communications apparatus that determines whether to communicate an update message to a UICC. The wireless communications apparatus can comprise means for receiving a status update message from at least one of a first RAT module supporting a first RAT and a second RAT module supporting a second RAT, wherein the first RAT and the second RAT are different. Moreover, the wireless communications apparatus can include means for determining whether to generate a UICC update message to update a UICC by applying one or more RAT arbitration factors to the received status update message, wherein the UICC includes current UICC status information associated with a current RAT.

Another aspect relates to a wireless communications apparatus. The apparatus can include at least one processor configured to receive a status update message from at least one of a first RAT module supporting a first RAT and a second RAT module supporting a second RAT, wherein the first RAT and the second RAT are different. Moreover, the at least one processor may further be configured to determine whether to generate a UICC update message to update a UICC by applying one or more RAT arbitration factors to the received status update message, wherein the UICC includes current UICC status information associated with a current RAT.

Still another aspect relates to a computer program product, which can have a computer-readable medium including at least one instruction for receiving a status update message from at least one of a first RAT module supporting a first RAT and a second RAT module supporting a second RAT, wherein the first RAT and the second RAT are different. Moreover, the computer-readable medium can comprise at least one instruction for determining whether to generate a UICC update message to update a UICC by applying one or more RAT arbitration factors to the received status update message, wherein the UICC includes current UICC status information associated with a current RAT.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Generally, a UICC may be provided with information associated with the wireless communication system in which the terminal is operating. For example, card application toolkit (CAT) specifications (ETSI TS 102.223 and 3GPP 31.111) indicate that if a location status or location information status have been changed, the terminal informs the UICC with an Event Download-Location Status envelope command. Similarly, if the terminal detects a change in the current RAT it may notify the UICC with an Event Download-Access Technology Change envelope message. As used herein, although multiple RATS may be active at one time, the current RAT is defined as the RAT that most recently provided status information to the UICC. Further, UICC may poll location status information and current RAT information by using commands, such as a Provide Local Information proactive command. As noted above, when the wireless communication system includes multiple RATs, then a UE may perform additional arbitration processing to avoid RAT based confusion for the UICC.

Figure 1:
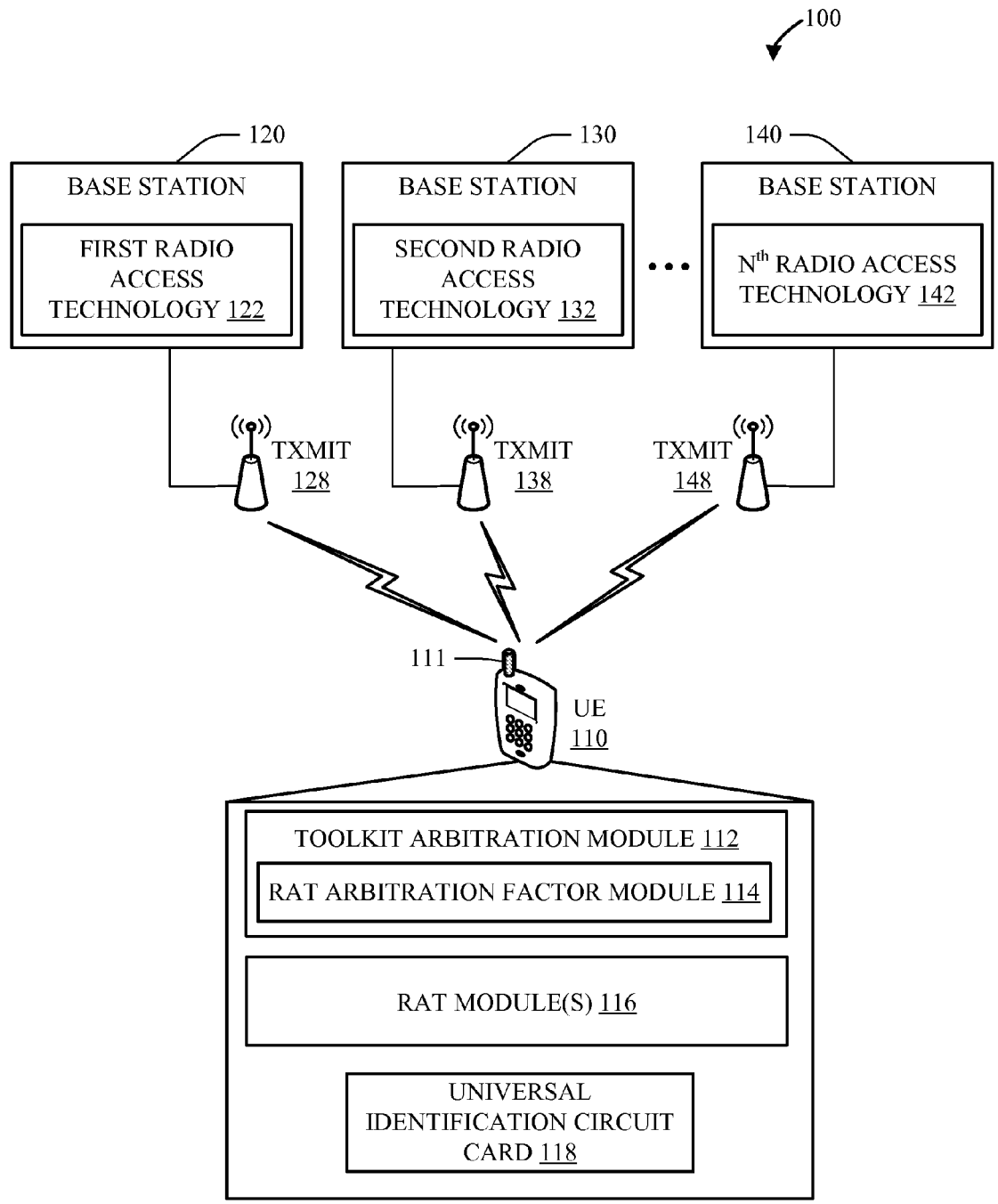
FIG. 1 depicts a block diagram of a wireless communications system in which UICC update arbitration is performed, according to an aspect.

With reference now to FIG. 1, a block diagram of a system 100 for providing UICC update arbitration is illustrated. System 100 may include a plurality of base stations 120, 130, 140 (e.g. Node-B, E-Node-B, etc.) and one or more wireless communications devices (WCD) (110) (e.g. terminals, UEs), which can communicate via respective antennas 128, 138, 148 and 111. In one aspect, base stations 120, 130 and 140 may conduct a downlink (DL) communications to UE 110 via antenna 128, 138 and 148 respectively. At UE 110, the DL communications may be received via antenna 111. The UE 110 may conduct uplink (UL) communications to base stations 120 and 130 via antennas 111. At the base stations 120, 130, and 140 the UL communications may be received via antennas 128, 138, and 148 respectively. Further, base station 120 may be operable to communicate using a first RAT 122, base station 130 may be operable to communicate using a second RAT 132, and base station 140 may be operable to communicate using an Nth RAT 142. In one aspect, the first RAT 122, the second RAT 132, and the Nth RAT 142 are different from each other. In another aspect, the first RAT 122, the second RAT 132 and/or the Nth RAT 142 may be operable to communicate using protocols, such as but not limited to, LTE, CDMA, TDMA, FDMA, OFDMA, SC-FDMA, TD-SCDMA, Global System for Mobile Communications (GSM), Universal Terrestrial Radio Access (UTRA), Evolved UTRA (E-UTRA), etc.

UE 110 may be operable to communicate with the multiple RATs using RAT module 116. In one aspect, each RAT may be processed by a RAT module 116 associated with its own chipset. In another aspect, the RAT modules 116 may be operable to run using a single chipset. In one aspect, UE 110 may include UICC 118 which may obtain system 100 information through various messages provided by toolkit arbitration module 112. In one aspect, UICC may include various modules such as but not limited to, a subscriber information module (SIM), a CDMA Subscriber Identity Module (CSIM), etc. In one aspect, toolkit arbitration module 112 may include RAT arbitration factor module 114 that is operable to assist toolkit arbitration module 112 in determining if/when a system update message may be communicated to UICC 118.

Generally, the UE 110 may inform the UICC 118 with an Event Download-Location Status envelope command. Similarly, if the UE 110 detects a change in the current RAT (122, 132, 142) the UE 110 may notify the UICC 118 with an Event Download-Access Technology Change envelope command. Further, UICC 118 may poll location status information and current RAT (122, 132, 142) information by using commands, such as a Provide Local Information proactive command.

In operation, when system and/or service information has been changed, the UE 110 may determine whether to transmit an update message to the UICC 118. In one aspect, toolkit arbitration module 112 may determine which update message (e.g., Location Status and Access Technology Change envelope commands) may be sent to the UICC 118. In one aspect, RAT arbitration factor module 114 may assist in the determination, based on factors such as, but not limited to, the service state of the RAT (e.g., Normal, Limited, None), the currently stored RAT information and priority rankings between RATs, previously transmitted update messages (e.g., avoiding duplication of messages), etc. In one aspect, the RAT priority rankings may be further based on various factors, such as but not limited to, available data rates for each RAT, service provider defined preferences, user defined preferences, etc.

Accordingly, the proposed UICC update arbitration process avoids UICC confusion in a system 100 in which a plurality of RATs (122, 132, 142) are active.

Figure 2:
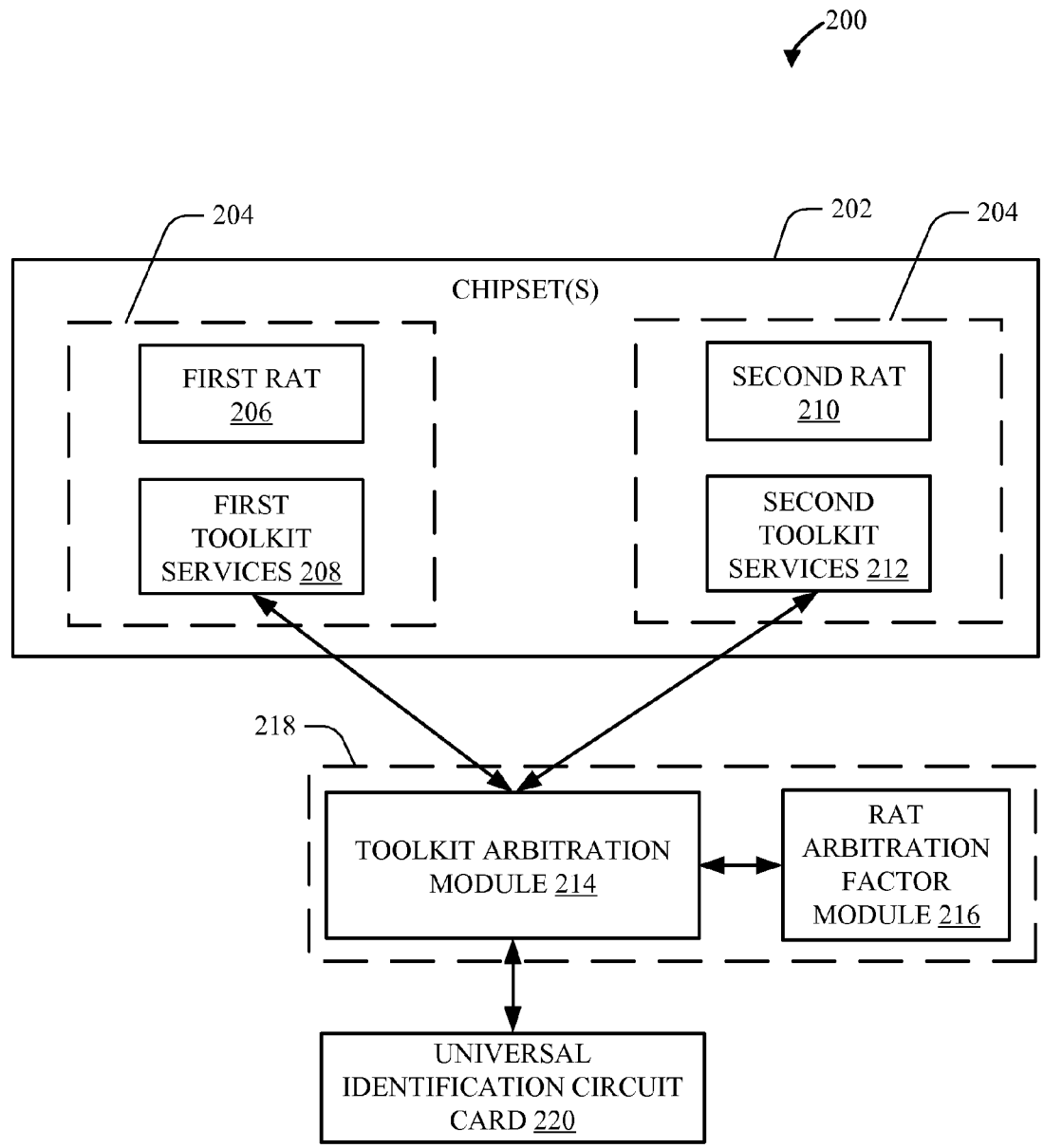
FIG. 2 depicts a block diagram of a UE with various configurations to implement UICC update arbitration, according to an aspect.

With reference to FIG. 2, UE 200 with various configurations to implement UICC update arbitration is depicted. UE may include one or more chipsets 202 to implement communications with multiple RATs (e.g., a first RAT 206, and a second RAT 210). The depiction of only two RATs is not meant as limiting, but rather only two RATs are depicted for clarity purposes. One of ordinary skill in the art would understand the system is limited to two RATs. In one aspect, updates associated with each RAT (206, 210) may be processed using a first toolkit service 208 and a second toolkit service 212, respectively. In one optional aspect, each RAT may be operable through a separate chipset 204. UE 200 may include toolkit arbitration module 214. Toolkit arbitration module 214 may be communication RAT arbitration factor module 216 that is operable to assist toolkit arbitration module 214 in determining if/when a system update message may be communicated to UICC 220. In one aspect, toolkit arbitration module 214 and RAT arbitration factor module 216 may be logically separate modules. In another aspect, toolkit arbitration module 214 and RAT arbitration factor module 216 may be logically combined within a single module 218.

Figure 3:
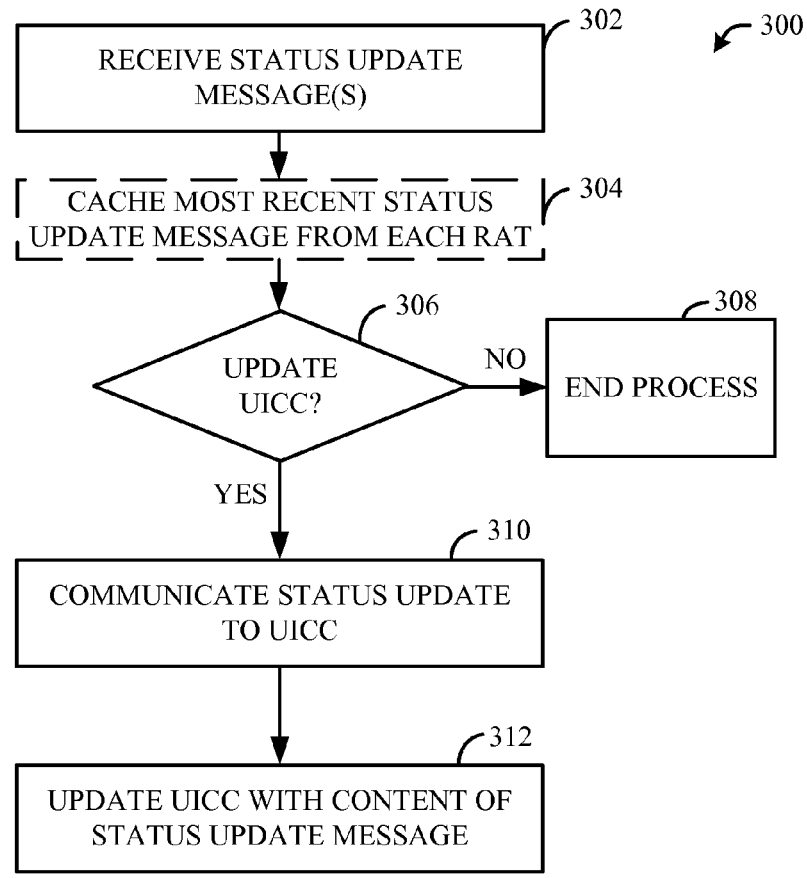
FIG. 3 depicts a flowchart describing an example system for performing UICC update arbitration, according to an aspect.
Figure 4:
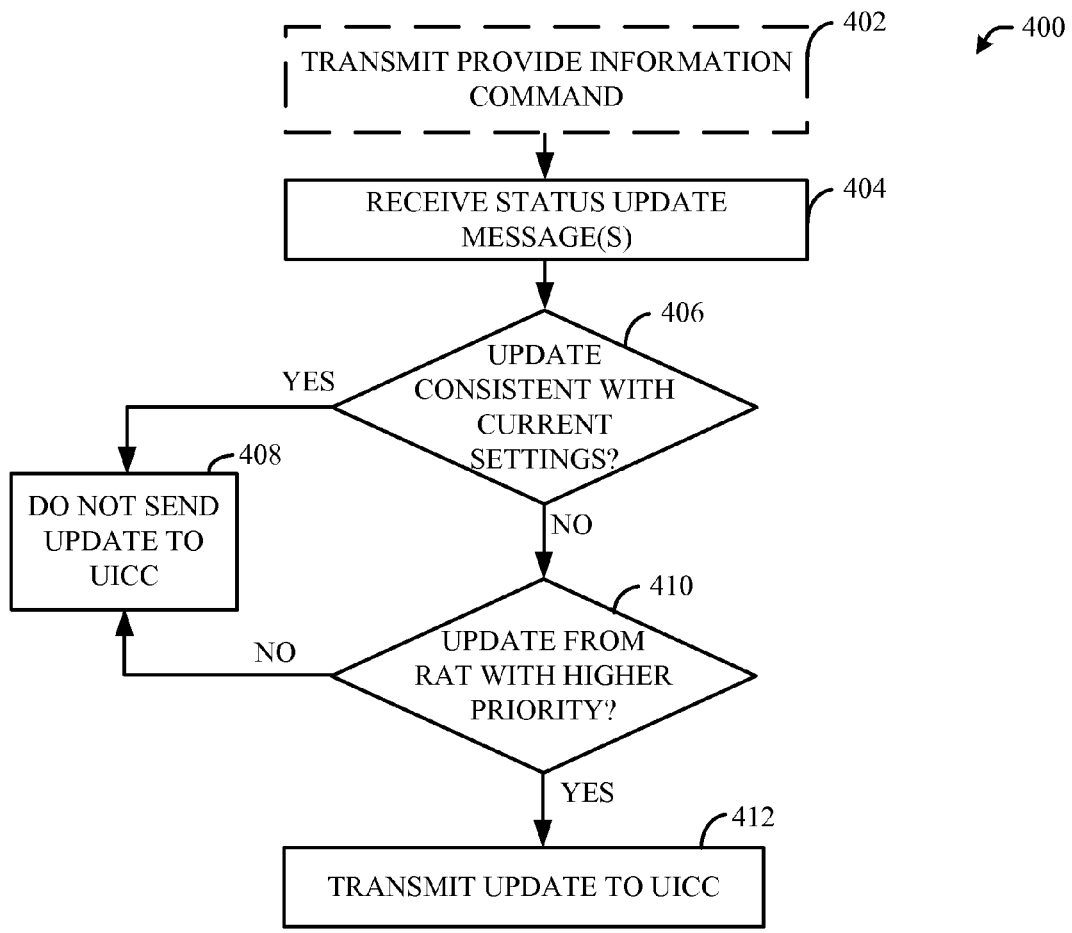
FIG. 4 depicts a flowchart describing another example system for performing UICC update arbitration, according to an aspect.

FIGS. 3 and 4 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 3, an example flowchart describing a system for performing UICC update arbitration is illustrated. At block 302, a UE may receive one or more service status update messages. In one aspect, the UE may be operable to contemporaneously communicate with multiple RATs. In one aspect, the RATs may include LTE, CDMA, CDMA2000, GSM, UTRAN, E-UTRAN, TETRA, TD-SCDMA, etc. In one aspect, each RAT is supported be a different chip set. Further, a service update message may include, but is not limited to: service status (e.g., normal service, limited service, no service), RAT information (e.g., GSM, WCDMA, LTE, CDMA, etc.), RAT specific location information (e.g., MCC/MNC, Cell ID for UMTS system), etc. At block 304, in an optional aspect, the UE may cache the most recent status update message from each RAT.

At block 306, when a service status update of a particular RAT arrives, the UE decision logic may choose the most appropriate service status update based on one or more RAT arbitration factors. In one aspect, the RAT arbitration factors may include service status priorities with normal service having highest priority and no service having lowest priority, RAT priorities, etc. If at block 306, the UE decision logic determines an update message is not appropriate, then at block 308 the process may terminate. By contrast, if at block 306 the UE decision logic determines an update message is appropriate, then at block 310 the determined status message may be communicated to the UICC. At block 312, the UICC may update setting based on the information provided in the service status update message. In one aspect, status update message information may include location status events, access technology change events and Provide Location Information terminal response. Further, in one aspect, the UICC may be updated based on requirement and/or as provided in the (U)SAT specification.

With reference now to FIG. 4, an example flowchart describing a system for performing UICC update arbitration is illustrated. At block 402, in one optional aspect, a UICC associated with a UE may transmit a PLI proactive command to obtain current system information. At block 404, the UE may receive one or more status update messages. In one aspect, the status update message may be in response to the optionally transmitted PLI proactive command. In another aspect, changes in RAT service and/or RAT status may prompt an RAT module to provide a status update message. In another aspect, the messages may include, but are not limited to, a location status envelope message, an access technology change envelope message, a response to a PLI proactive command, etc. At block 406, it determines whether the received update message is associated with a RAT that is consistent with current information provided to the UICC. If at block 406, it is determined that the update message is at least substantially consistent with setting previously provided to the UICC, then at block 408, no update message is sent to the UICC. In such an aspect, reduced update duplication may be achieved. By contrast, if at block 406, it is determined that the update message is not at least substantially consistent with setting previously provided to the UICC, then at block 410, it is determined if the update message RAT has been assigned higher priority than the current RAT values. In one aspect, priority rankings may be assigned based on any number of factors, such as, but not limited to, available data rates for each RAT, service provider defined preferences, user defined preferences, etc. If at block 410, it is determined that the update message RAT has been assigned higher priority than the serving RAT, then at block 412, the received update message may be transmitted to the UICC. By contrast, if at block 410, it is determined that the update message RAT has not been assigned higher priority than the current RAT values, then at block 408, no update message is sent to the UICC.

Figure 5:
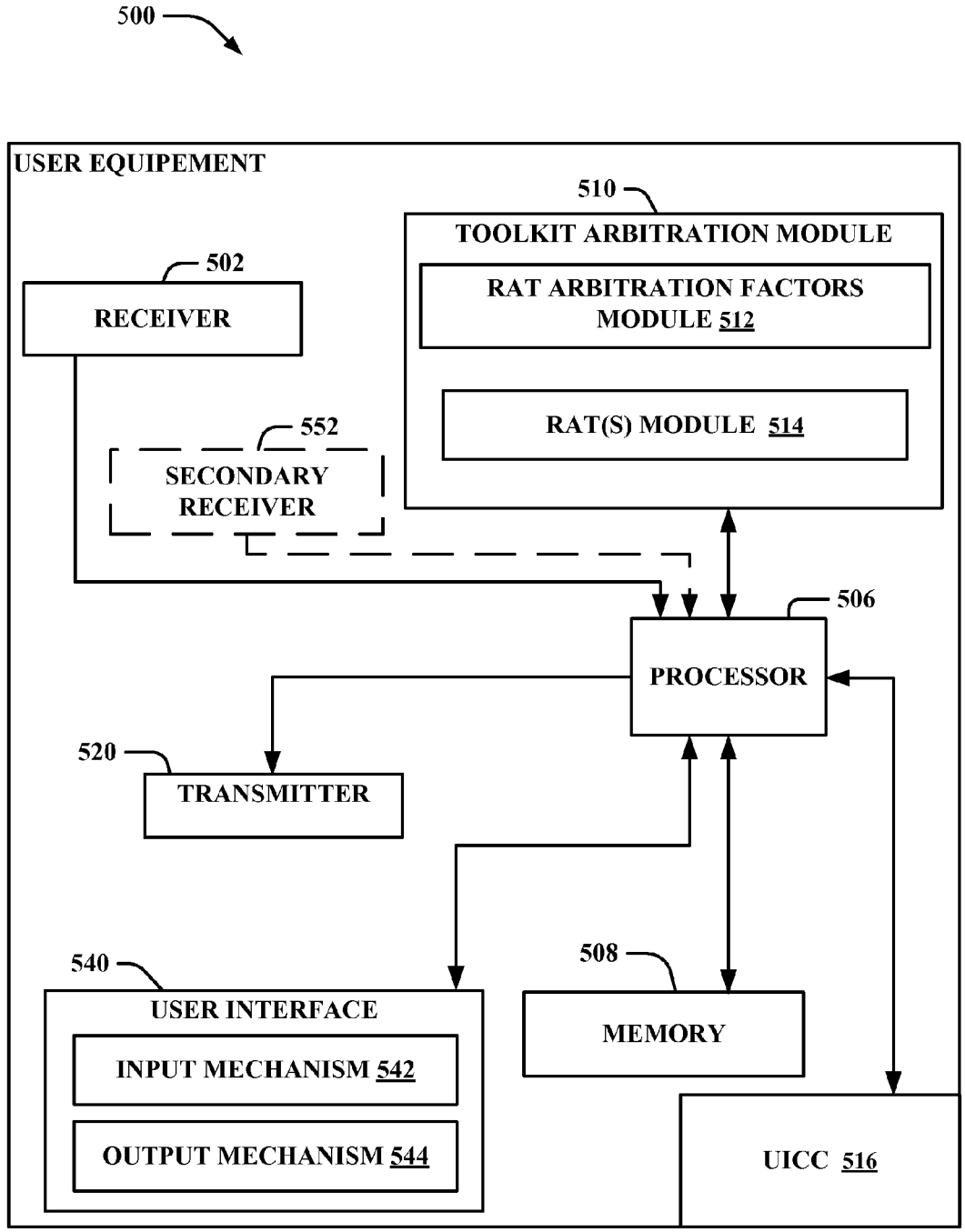
FIG. 5 depicts a block diagram of an example UE for providing UICC update arbitration according to an aspect.

With reference now to FIG. 5, an illustration of a user equipment (UE) 500 (e.g. a client device, wireless communications device (WCD), etc.) that assist in avoiding physical random access channel (PRACH) collisions during random access procedures is presented. UE 500 comprises receiver 502 that receives one or more signal from, for instance, one or more receive antennas (not shown), performs typical actions on (e.g., filters, amplifies, downconverts, etc.) the received signal, and digitizes the conditioned signal to obtain samples. Receiver 502 can further comprise an oscillator that can provide a carrier frequency for demodulation of the received signal and a demodulator that can demodulate received symbols and provide them to processor 506 for channel estimation. In one aspect, UE 500 may further comprise secondary receiver 552 and may receive additional channels of information.

Processor 506 can be a processor dedicated to analyzing information received by receiver 502 and/or generating information for transmission by one or more transmitters 520 (for ease of illustration, only one transmitter is shown), a processor that controls one or more components of UE 500, and/or a processor that both analyzes information received by receiver 502 and/or receiver 552, generates information for transmission by transmitter 520 for transmission on one or more transmitting antennas (not shown), and controls one or more components of UE 500.

In one aspect, processor 506 may provide means for receiving a status update message from at least one of a first RAT module supporting a first RAT and a second RAT module supporting a second RAT, wherein the first RAT and the second RAT are different, and means for determining whether to generate a UICC update message to update a UICC by applying one or more RAT arbitration factors to the received status update message, wherein the UICC includes current UICC status information associated with a current RAT.

UE 500 can additionally comprise memory 508 that is operatively coupled to processor 506 and that can store data to be transmitted, received data, information related to available channels, data associated with analyzed signal and/or interference strength, information related to an assigned channel, power, rate, or the like, and any other suitable information for estimating a channel and communicating via the channel. Memory 508 can additionally store protocols and/or algorithms associated with estimating and/or utilizing a channel (e.g., performance based, capacity based, etc.). In one aspect, UE 500 may include UICC 516 which may obtain system information through various messages provided by toolkit arbitration module 510. In one aspect, UICC may include various modules such as but not limited to, a subscriber information module (SIM), a CDMA Subscriber Identity Module (CSIM), etc.

It will be appreciated that the data store (e.g., memory 508, UICC 516) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 508 of the subject systems and methods is intended to comprise, without being limited to, these and any other suitable types of memory.

UE 500 can further include toolkit arbitration module 510. Toolkit arbitration module 510 may be associated with RAT arbitration factors module 512 and RAT module 514. In one aspect, toolkit arbitration module 510 may include RAT arbitration factor module 512 that is operable to assist toolkit arbitration module 510 in determining if/when a system update message may be communicated to UICC 516. In one aspect, each RAT active in a system may be processed by a RAT modules 514 associated with its own chipset. In another aspect, the RAT modules 514 may be operable to run using a single chipset. In one aspect, RAT arbitration factor module 512 may assist in the determination, based on factors such as, but not limited to, the service state of the RAT (e.g., Normal, Limited, None), the currently serving RAT and priority rankings between RATs, previously transmitted update messages (e.g., avoiding duplication of messages), etc. In one aspect, the RAT priority rankings may be further based on various factors, such as but not limited to, available data rates for each RAT, service provider defined preferences, user defined preferences, etc. Operation of toolkit arbitration module 510 is depicted in the flowcharts of FIG. 3.

Additionally, UE 500 may include user interface 540. User interface 540 may include input mechanisms 542 for generating inputs into UE 500, and output mechanism 544 for generating information for consumption by the user of UE 500. For example, input mechanism 542 may include a mechanism such as a key or keyboard, a mouse, a touchscreen display, a microphone, etc. Further, for example, output mechanism 544 may include a display, an audio speaker, a haptic feedback mechanism, a Personal Area Network (PAN) transceiver etc. In the illustrated aspects, output mechanism 544 may include a display operable to present content that is in image or video format or an audio speaker to present content that is in an audio format.

Figure 6:
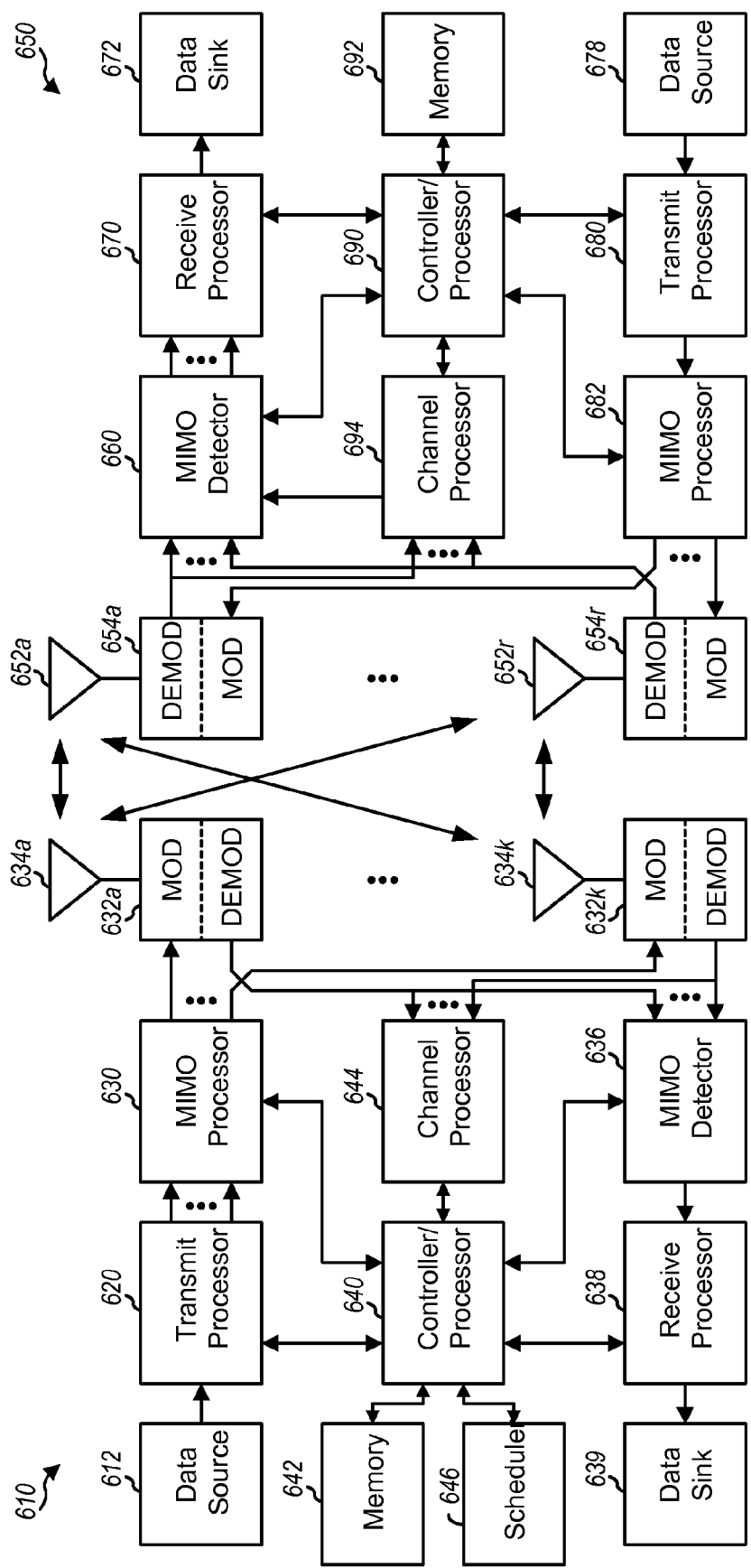
FIG. 6 depicts a block diagram of a design of a base station and a UE in an access network.

FIG. 6 shows a block diagram of a design of a base station 610 and a UE 650. A base station may also be referred to as a Node B, an evolved Node B (eNB), an access point, etc. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. In the design shown in FIG. 6, base station 610 is equipped with K antennas 634a through 634k, and UE 650 is equipped with R antennas 652a through 652r, where in general K≥1 and R≥1.

At base station 610, a transmit processor 620 may receive data for one or more UEs from a data source 612, process (e.g., encode and modulate) the data for each UE based on one or more modulation and coding schemes for that UE, and provide data symbols for all UEs. Transmit processor 620 may also generate control symbols for control information. Transmit processor 620 may further generate reference/pilot symbols for one or more reference signals. A MIMO processor 630 may perform precoding on the data symbols, the control symbols, and/or the reference symbols, if applicable, and may provide K output symbol streams to K modulators (MOD) 632a through 632k. Each modulator 632 may process its output symbol stream (e.g., for OFDM) to obtain an output sample stream. Each modulator 632 may further condition (e.g., convert to analog, filter, amplify, and upconvert) its output sample stream and generate a downlink signal. K downlink signals from modulators 632a through 632k may be transmitted via antennas 634a through 634k, respectively.

At UE 650, R antennas 652a through 652r may receive the K downlink signals from base station 610, and each antenna 652 may provide a received signal to an associated demodulator (DEMOD) 654. Each demodulator 654 may condition (e.g., filter, amplify, downconvert, and digitize) its received signal to obtain samples and may further process the samples (e.g., for OFDM) to obtain received symbols. Each demodulator 654 may provide received data symbols to a MIMO detector 660 and provide received reference symbols to a channel processor 694. Channel processor 694 may estimate the response of the downlink channel from base station 610 to UE 650 based on the received reference symbols and may provide a channel estimate to MIMO detector 660. MIMO detector 660 may perform MIMO detection on the received data symbols based on the channel estimate and provide symbol estimates, which may be estimates of the transmitted symbols. A receive processor 670 may process (e.g., demodulate and decode) the symbol estimates based on the modulation and coding scheme(s) used for UE 650, provide decoded data to a data sink 672, and provide decoded control information to a controller/processor 690.

UE 650 may estimate the downlink channel response and generate channel feedback information, which may comprise reported channel vectors. UE 650 may also estimate the downlink channel quality and determine channel quality indicator (CQI) information. Feedback information (e.g., the channel feedback information, CQI information, etc.), data from a data source 678, and a reference signal may be processed (e.g., encoded and modulated) by a transmit processor 680, precoded by a MIMO processor 682, if applicable, and further processed by modulators 654a through 654r to generate R uplink signals, which may be transmitted via antennas 652a through 652r. At base station 610, the R uplink signals from UE 650 may be received by K antennas 634a through 634k and processed by demodulators 632a through 632k. A channel processor 644 may estimate the response of the uplink channel from UE 650 to base station 610 and may provide a channel estimate to MIMO detector 636. MIMO detector 636 may perform MIMO detection based on the channel estimate and provide symbol estimates. A receive processor 638 may process the symbol estimates, provide decoded data to a data sink 639, and provide decoded feedback information to a controller/processor 640. Controller/processor 640 may control data transmission to UE 650 based on the feedback information.

Controllers/processors 640 and 690 may direct the operation at base station 610 and UE 650, respectively. Processor 694, processor 690 and/or other processors and modules at UE 650 may perform or direct process 300 in FIG. 3, and/or other processes for the techniques described herein. Processor 644, processor 640 and/or other processors and modules at base station 610 may also perform or direct process 300 in FIG. 3, and/or other processes for the techniques described herein. Memories 642 and 692 may store data and program codes for base station 610 and UE 650, respectively. A scheduler 646 may select UE 650 and/or other UEs for data transmission on the downlink and/or uplink based on the feedback information received from the UEs.

Figure 7:
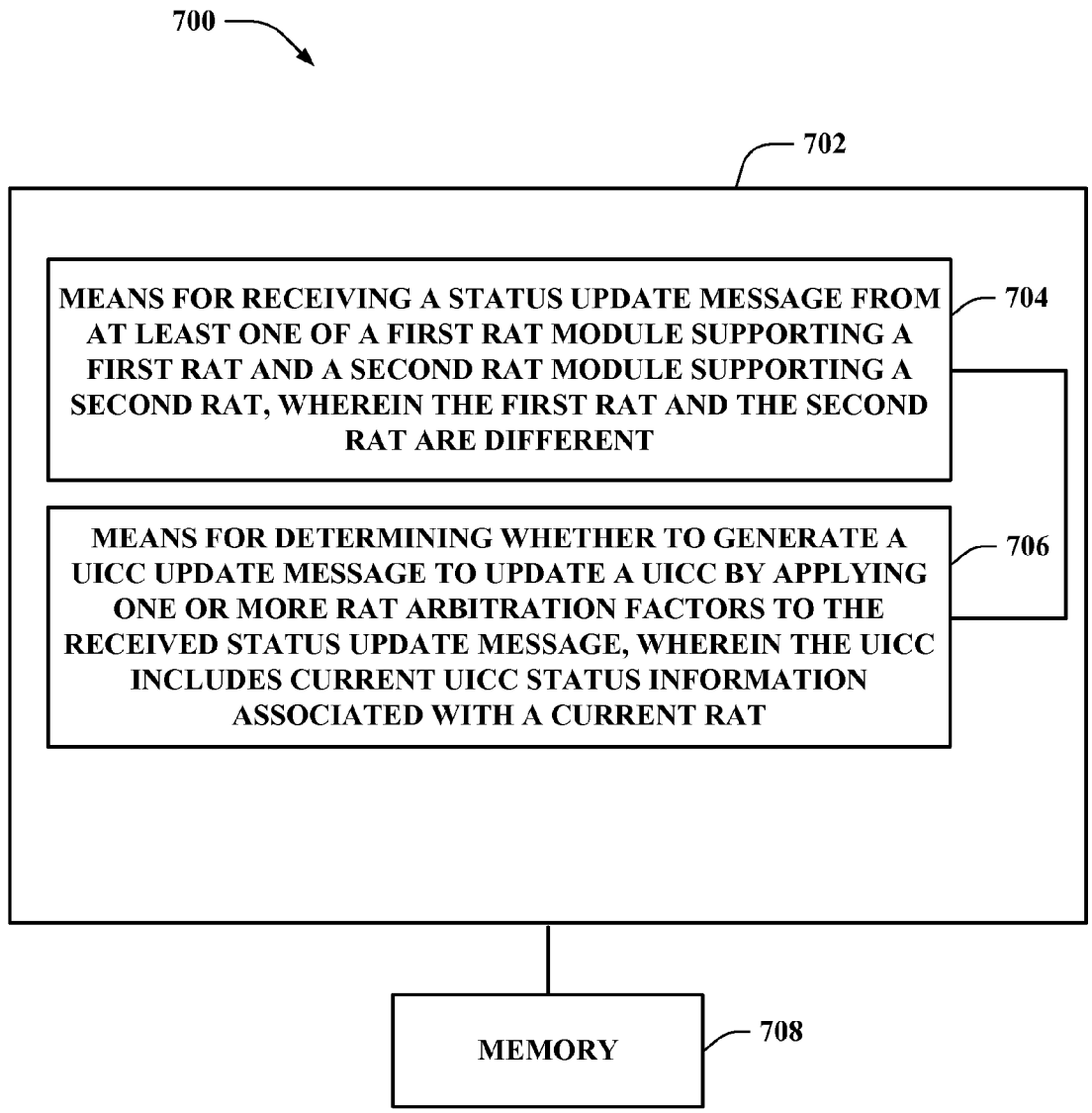
FIG. 7 depicts an example system for performing UICC update arbitration in a wireless communication system.

Referring to FIG. 7, an apparatus 700 that provides for UICC update arbitration. It is to be appreciated that apparatus 700 is represented as including functional blocks, which can represent functions implemented by a processor, software, or combination thereof (e.g., firmware). As such, apparatus 700 includes a logical grouping 702 of electrical components that can act in conjunction. For instance, logical grouping 702 can include means for receiving a status update message from at least one of a first RAT module supporting a first RAT and a second RAT module supporting a second RAT, wherein the first RAT and the second RAT are different (Block 704). For example, in an aspect, the means 704 can include receiver 502, toolkit arbitration module 510, and/or processor 506. In one aspect, the status update message may include information such as a service status, RAT information, location information, etc. In one aspect, the first RAT and the second RAT may include LTE, CDMA, CDMA2000, GSM, UTRAN, E-UTRAN, TETRA, TD-SCDMA, etc. In one aspect, each RAT is supported be a different chip set.

Further, logical grouping 702 can include means for determining whether to generate a UICC update message to update a UICC by applying one or more RAT arbitration factors to the received status update message, wherein the UICC includes current UICC status information associated with a current RAT (Block 706). For example, in an aspect, the means 706 can include RAT arbitration factors module 512 and/or processor 506. In one aspect, the UICC may be an SIM, a CSIM, etc. In one aspect, the one or more RAT arbitration factors may be accessed from a separate RAT arbitration factors module.

Additionally, apparatus 700 can include a memory 708 that retains instructions for executing functions associated with electrical components 704 and 706. While shown as being external to memory 708, it is to be understood that one or more of electrical components 704 and 706 can exist within memory 708. In an aspect, for example, memory 708 may be the same as or similar to memory 508 and/or UICC 516 (FIG. 5).

In one aspect, apparatus 700 can provide means for determining that information included in the received status update message is consistent with the current UICC status information, and means for avoiding generation of the UICC update message. In one aspect, apparatus 700 can provide means for determining which of the first RAT module and the second RAT module is associated with a highest ranking service status. In such an aspect, one of the one or more RAT arbitration factors comprises a service status priority wherein normal service is ranked higher than limited service and limited service is ranked higher than no service. In another aspect, apparatus 700 can provide means for determining that the RAT information indicates a priority of the RAT associated with the received status update message has a priority ranking higher than that of the current RAT, and means for generating the UICC update message. Further, in such an aspect, priority ranking may be based on available data rates for each RAT, service provider defined preferences, user defined preferences, etc.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA, TD-SCDMA and other systems. The terms "system" and "network" are often used interchangeably. A CDMA system may implement a radio technology such as UTRA, CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as GSM. An OFDMA system may implement a radio technology such as E-UTRA, Ultra Mobile Broadband (UMB), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

What is claimed is:

1. A method of wireless communications, comprising:
   receiving a status update message from at least one of a first radio access technology (RAT) module supporting a first RAT and a second RAT module supporting a second RAT, wherein the first RAT and the second RAT are different, and the status update message includes a service status; and
   determining whether to generate a universal integrated circuit card (UICC) update message to update a UICC by applying one or more RAT arbitration factors to the received status update message, wherein the UICC includes current UICC status information associated with a current RAT, and wherein one of the one or more RAT arbitration factors comprises a service status priority.

2. The method of claim 1, wherein the status update message further includes at least one of: RAT information and location information.

3. The method of claim 2, further comprising:
   determining that information included in the received status update message is consistent with the current UICC status information; and
   avoiding generation of the UICC update message.

4. The method of claim 1,
   wherein the service status comprises one of normal service, limited service, and no service, and
   wherein the service status priority is that normal service is ranked higher than limited service and limited service is ranked higher than no service, further comprising:
   determining which of the first RAT module and the second RAT module is associated with a highest ranking service status.

5. The method of claim 2, further comprising:
   determining that the RAT information indicates a priority of the RAT associated with the received status update message has a priority ranking higher than that of the current RAT; and
   generating the UICC update message.

6. The method of claim 5, wherein the priority ranking is based on at least one of:
   available data rates for each RAT;
   service provider defined preferences; and
   user defined preferences.

7. The method of claim 1, wherein the first RAT and the second RAT include at least two of LTE, CDMA, CDMA2000, GSM, UTRAN, E-UTRAN, TETRA, or TD-SCDMA.

8. The method of claim 1, wherein the UICC comprises at least one of:
   a subscriber information module (SIM); and
   a CDMA Subscriber Identity Module (CSIM).

9. The method of claim 1, wherein the first RAT module is supported by a first chipset, and wherein the second RAT module is supported by a second chipset.

10. The method of claim 1, wherein the one or more RAT arbitration factors are accessed from a separate RAT arbitration factors module.

11. A non-transitory computer program product, comprising:
    a computer-readable medium comprising code for:
    receiving a status update message from at least one of a first RAT module supporting a first RAT and a second RAT module supporting a second RAT, wherein the first RAT and the second RAT are different, and the status update message includes a service status; and
    determining whether to generate a UICC update message to update a UICC by applying one or more RAT arbitration factors to the received status update message, wherein the UICC includes current UICC status information associated with a current RAT, and wherein one of the one or more RAT arbitration factors comprises a service status priority.

12. The non-transitory computer program product of claim 11, wherein the status update message further includes at least one of: RAT information and location information.

13. The non-transitory computer program product of claim 12, wherein the computer-readable medium further comprises code for:
    determining that information included in the received status update message is consistent with the current UICC status information; and
    avoiding generation of the UICC update message.

14. The non-transitory computer program product of claim 11,
    wherein the service status comprises one of normal service, limited service, and no service, and
    wherein the service status priority is that normal service is ranked higher than limited service and limited service is ranked higher than no service, wherein the computer-readable medium further comprises code for:
    determining which of the first RAT module and the second RAT module is associated with a highest ranking service status.

15. The non-transitory computer program product of claim 12, wherein the computer-readable medium further comprises code for:
    determining that the RAT information indicates a priority of the RAT associated with the received status update message has a priority ranking higher than that of the current RAT; and
    generating the UICC update message.

16. The non-transitory computer program product of claim 15, wherein the priority ranking is based on at least one of:
    available data rates for each RAT;
    service provider defined preferences; and
    user defined preferences.

17. The non-transitory computer program product of claim 11, wherein the first RAT and the second RAT include at least two of LTE, CDMA, CDMA2000, GSM, UTRAN, E-UTRAN, TETRA, or TD-SCDMA.

18. The non-transitory computer program product of claim 11, wherein the UICC comprises at least one of: a SIM, and a CSIM.

19. The non-transitory computer program product of claim 11, wherein the first RAT module is supported by a first chipset, and wherein the second RAT module is supported by a second chipset.

20. The non-transitory computer program product of claim 11, wherein the one or more RAT arbitration factors are accessed from a separate RAT arbitration factors module.

21. An apparatus, comprising:
means for receiving a status update message from at least one of a first RAT module supporting a first RAT and a second RAT module supporting a second RAT, wherein the first RAT and the second RAT are different, and the status update message includes a service status; and
means for determining whether to generate a UICC update message to update a UICC by applying one or more RAT arbitration factors to the received status update message, wherein the UICC includes current UICC status information associated with a current RAT, and wherein one of the one or more RAT arbitration factors comprises a service status priority.

22. The apparatus of claim 21, wherein the status update message further includes at least one of: RAT information and location information.

23. The apparatus of claim 22, wherein the means for determining further comprises:
means for determining that information included in the received status update message is consistent with the current UICC status information; and
means for avoiding generation of the UICC update message.

24. The apparatus of claim 21,
wherein a service status comprises one of normal service, limited service, and no service, and
wherein the service status priority is that normal service is ranked higher than limited service and limited service is ranked higher than no service, wherein the means for determining further comprises:
determining which of the first RAT module and the second RAT module is associated with a highest ranking service status.

25. The apparatus of claim 22, wherein the means for determining further comprises:
means for determining that the RAT information indicates a priority of the RAT associated with the received status update message has a priority ranking higher than that of the current RAT; and
means for generating the UICC update message.

26. The apparatus of claim 25, wherein the priority ranking is based on at least one of:
available data rates for each RAT;
service provider defined preferences; and
user defined preferences.

27. The apparatus of claim 21, wherein the first RAT and the second RAT include at least two of LTE, CDMA, CDMA2000, GSM, UTRAN, E-UTRAN, TETRA, or TD-SCDMA.

28. The apparatus of claim 21, wherein the UICC comprises at least one of:
a SIM; and
a CSIM.

29. The apparatus of claim 21, wherein the first RAT module is supported by a first chipset, and wherein the second RAT module is supported by a second chipset.

30. The apparatus of claim 21, wherein the one or more RAT arbitration factors are accessed from a separate RAT arbitration factors module.

31. An apparatus for wireless communications, comprising:
at least one processor configured to:
receive a status update message from at least one of a first RAT module supporting a first RAT and a second RAT module supporting a second RAT,
wherein the first RAT and the second RAT are different, and the status update message includes a service status; and
determine whether to generate a universal integrated circuit card (UICC) update message to update a UICC by applying one or more RAT arbitration factors to the received status update message, wherein the UICC includes current UICC status information associated with a current RAT, and wherein one of the one or more RAT arbitration factors comprises a service status priority.

32. The apparatus of claim 31, wherein the status update message further includes at least one of: RAT information and location information.

33. The apparatus of claim 32, wherein the at least one processor is further configured to:
determine that information included in the received status update message is consistent with the current UICC status information; and
avoid generation of the UICC update message.

34. The apparatus claim 31,
wherein the service status comprises one of normal service, limited service, and no service, and
wherein the service status priority is that normal service is ranked higher than limited service and limited service is ranked higher than no service, and wherein the at least one processor is further configured to:
determine which of the first RAT module and the second RAT module is associated with a highest ranking service status.

35. The apparatus of claim 32, wherein the at least one processor is further configured to:
determine that the RAT information indicates a priority of the RAT associated with the received status update message has a priority ranking higher than that of the current RAT; and
generate the UICC update message.

36. The apparatus of claim 35, wherein the priority ranking is based on at least one of:
available data rates for each RAT;
service provider defined preferences; and
user defined preferences.

37. The apparatus of claim 31, wherein the first RAT and the second RAT include at least two of LTE, CDMA, CDMA2000, GSM, UTRAN, E-UTRAN, TETRA, or TD-SCDMA.

38. The apparatus of claim 31, wherein the UICC comprises at least one of:
a SIM; and
a CSIM.

39. The apparatus of claim 31, wherein the first RAT module is supported by a first chipset, and wherein the second RAT module is supported by a second chipset.

40. The apparatus of claim 31, wherein the one or more RAT arbitration factors are accessed from a separate RAT arbitration factors module.

* * * * *